Figure 24:
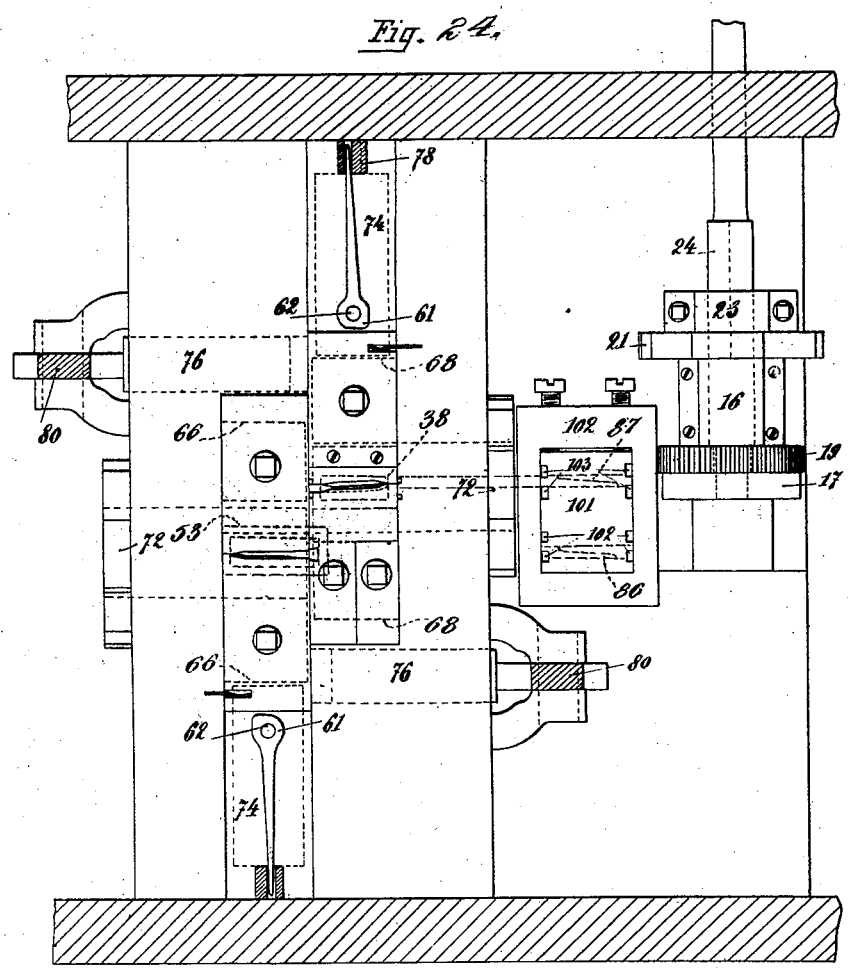

No. 749,135. PATENTED JAN. 5, 1904.
J. M. LAUGHLIN.
MACHINERY FOR THE MANUFACTURE OF HORSESHOE NAILS.
APPLICATION FILED NOV. 21, 1901.
NO MODEL. 14 SHEETS—SHEET 1.
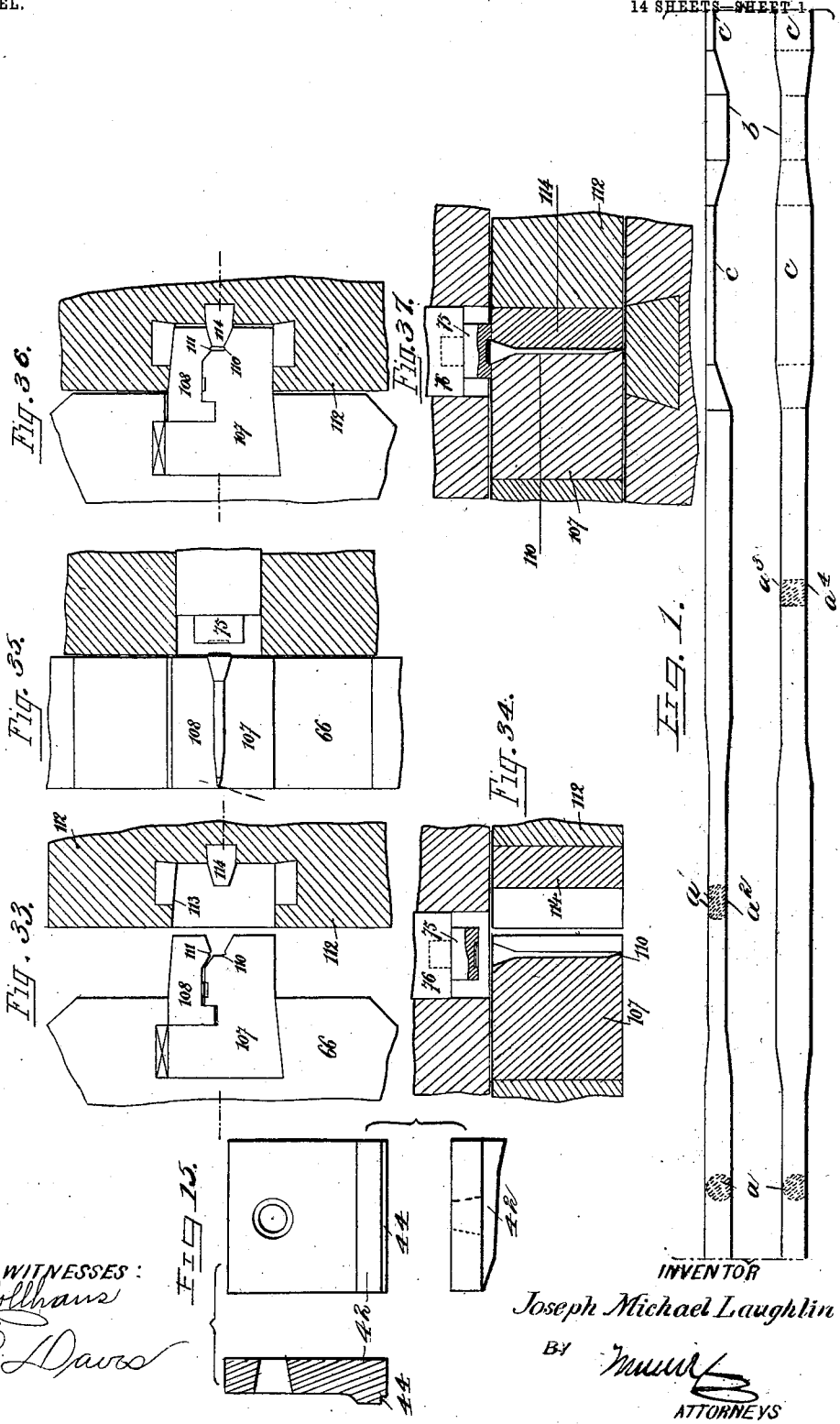
WITNESSES:
INVENTOR
Joseph Michael Laughlin
BY
ATTORNEYS

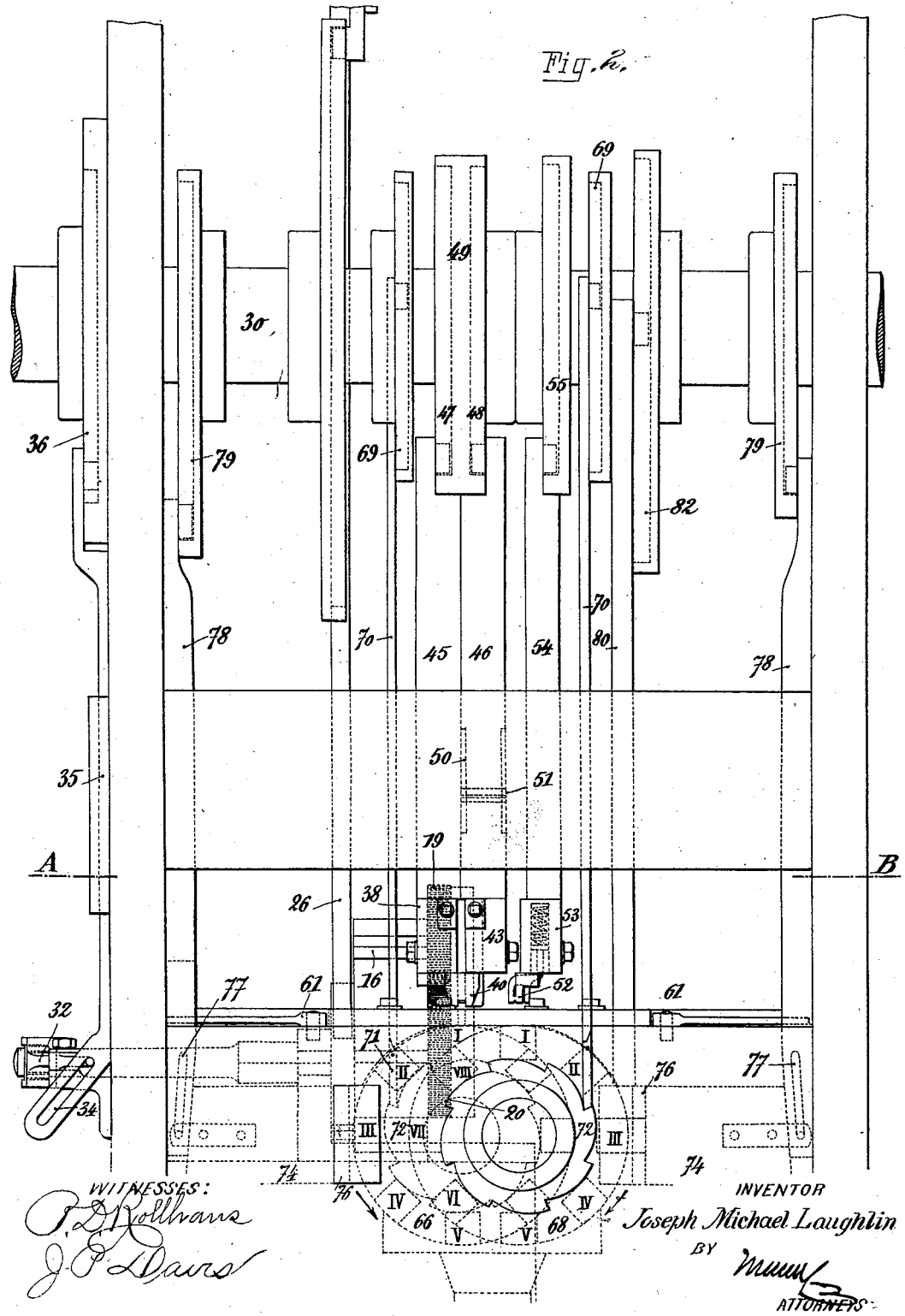

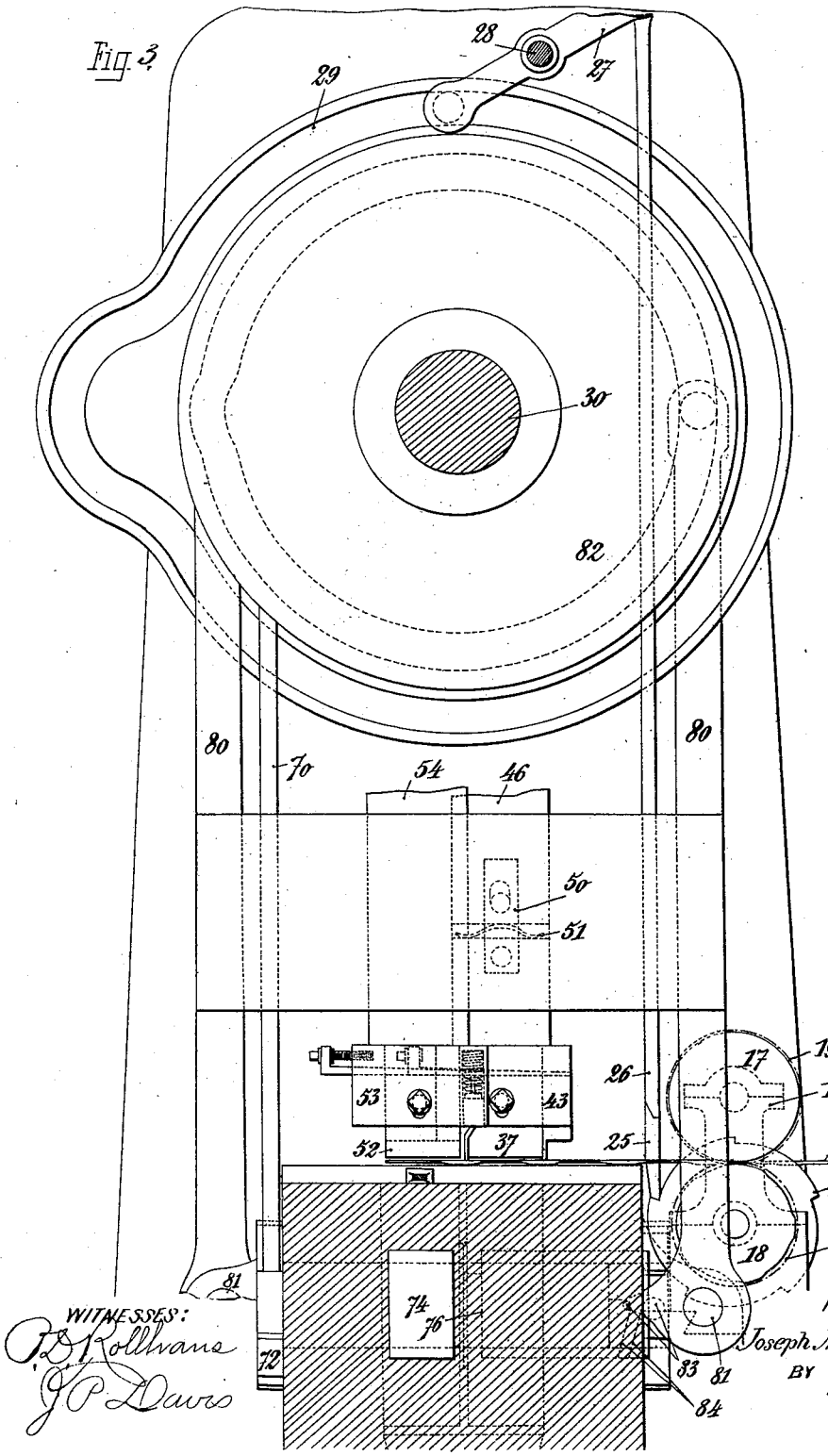

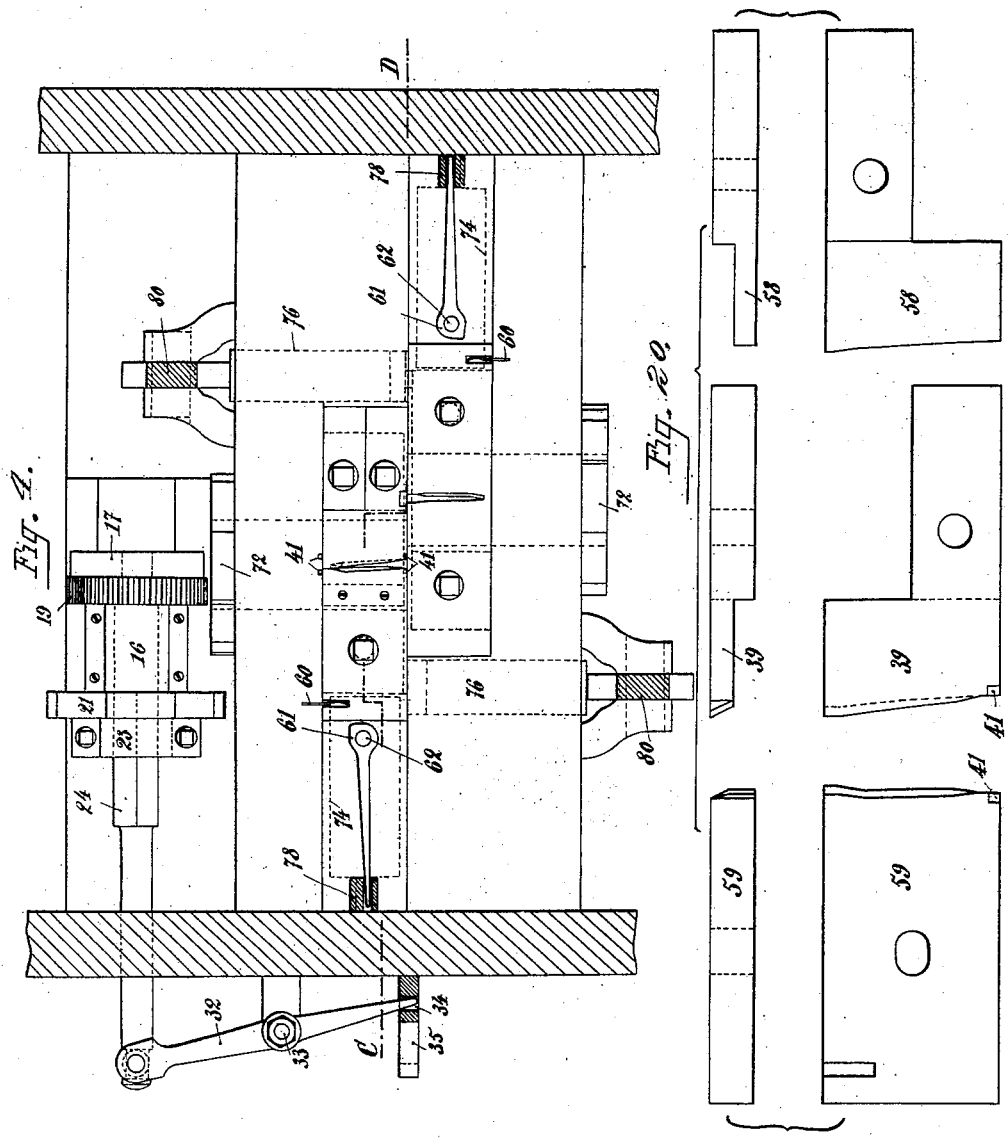

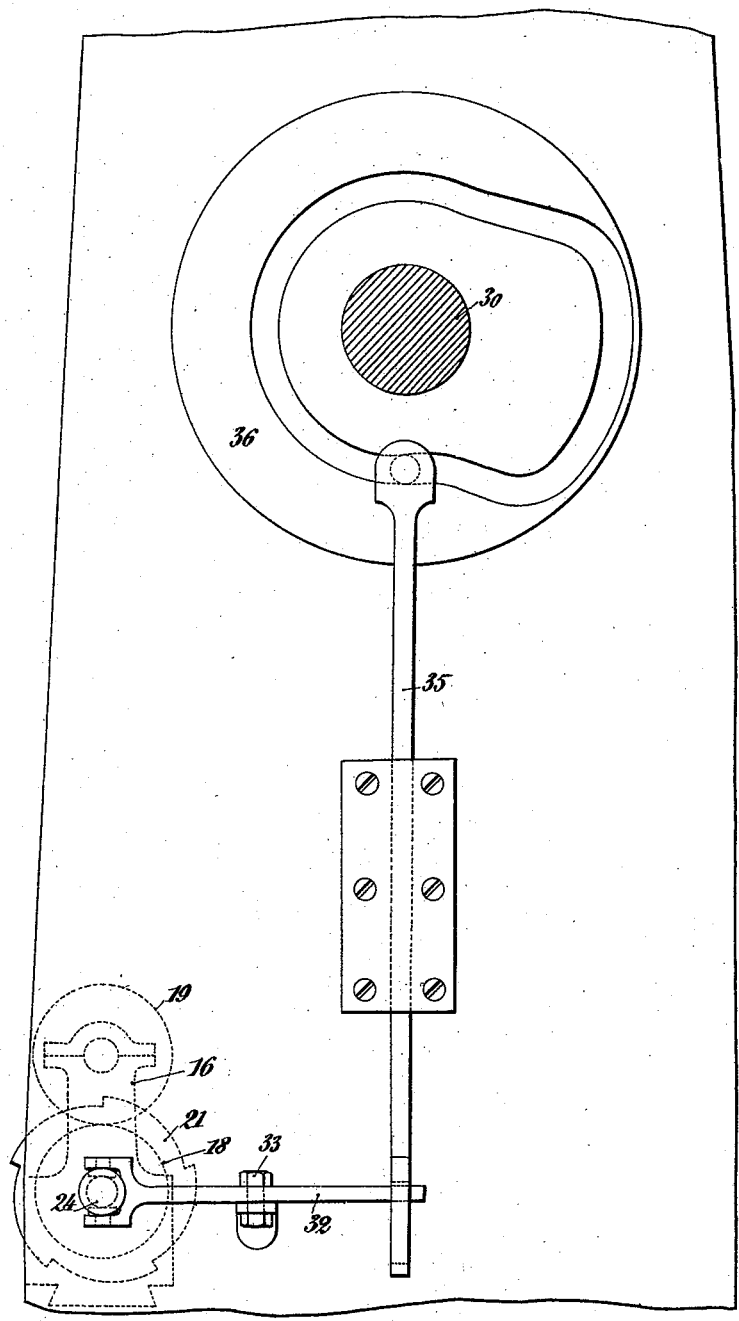

No. 749,135. PATENTED JAN. 5, 1904.
J. M. LAUGHLIN.
MACHINERY FOR THE MANUFACTURE OF HORSESHOE NAILS.
APPLICATION FILED NOV. 21, 1901.
NO MODEL. 14 SHEETS—SHEET 6.
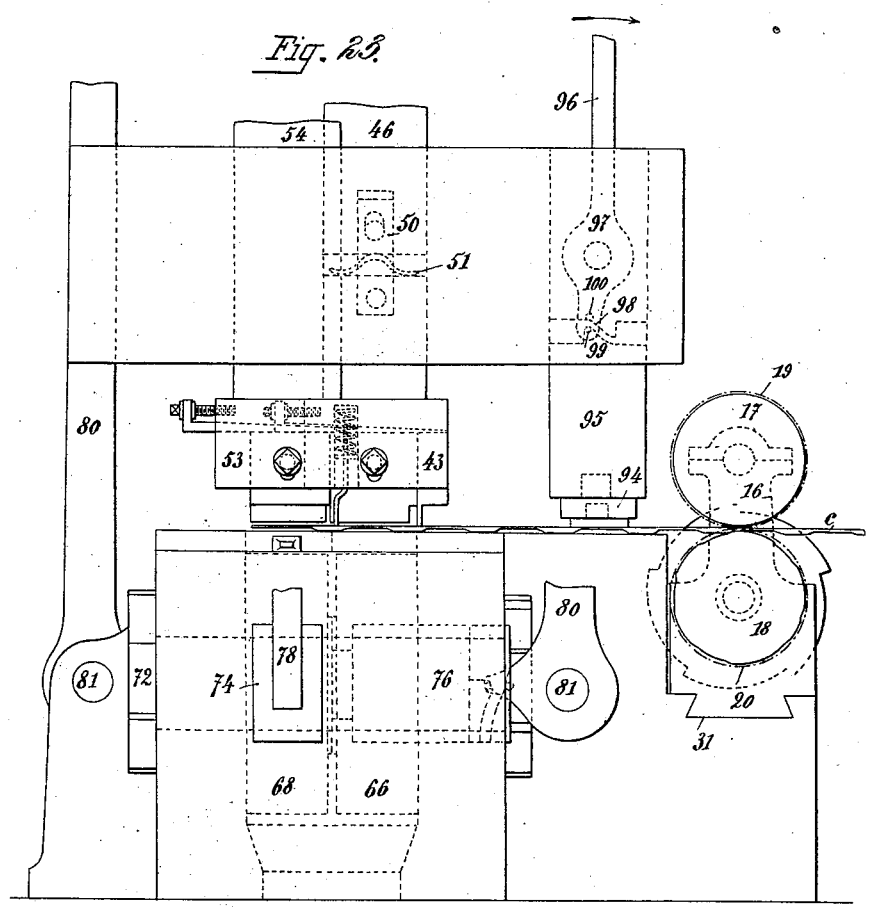
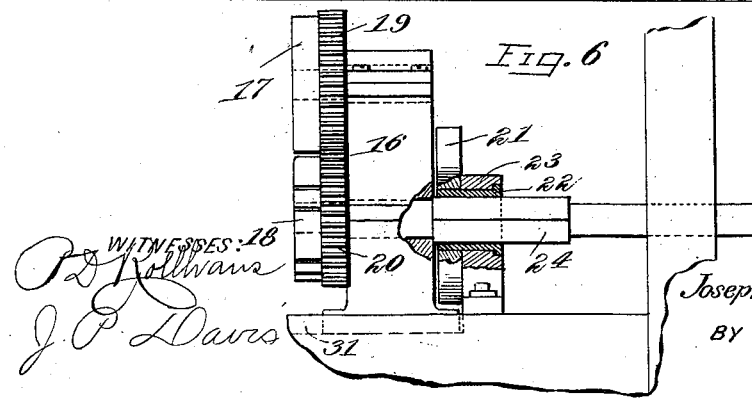
INVENTOR
Joseph Michael Laughlin

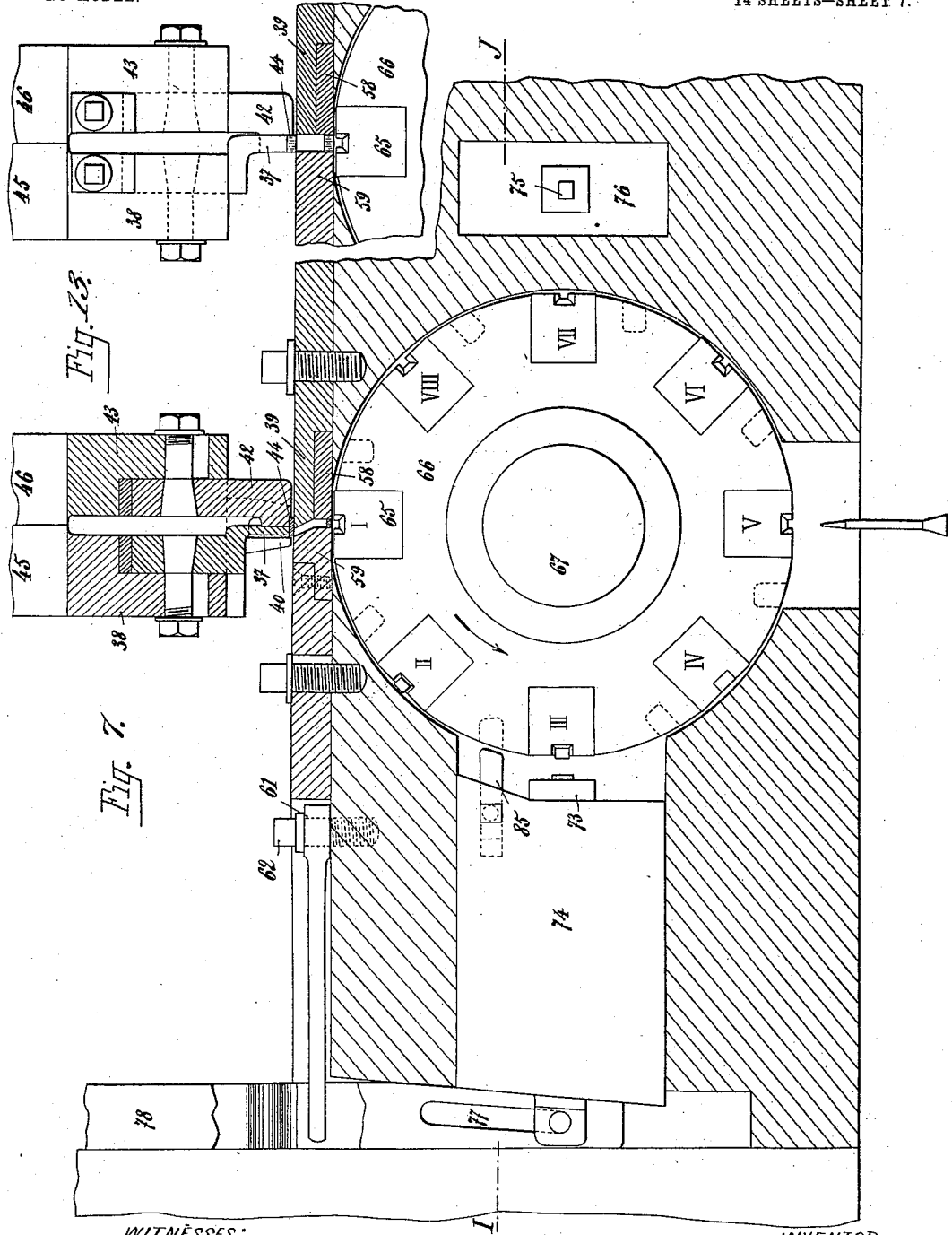

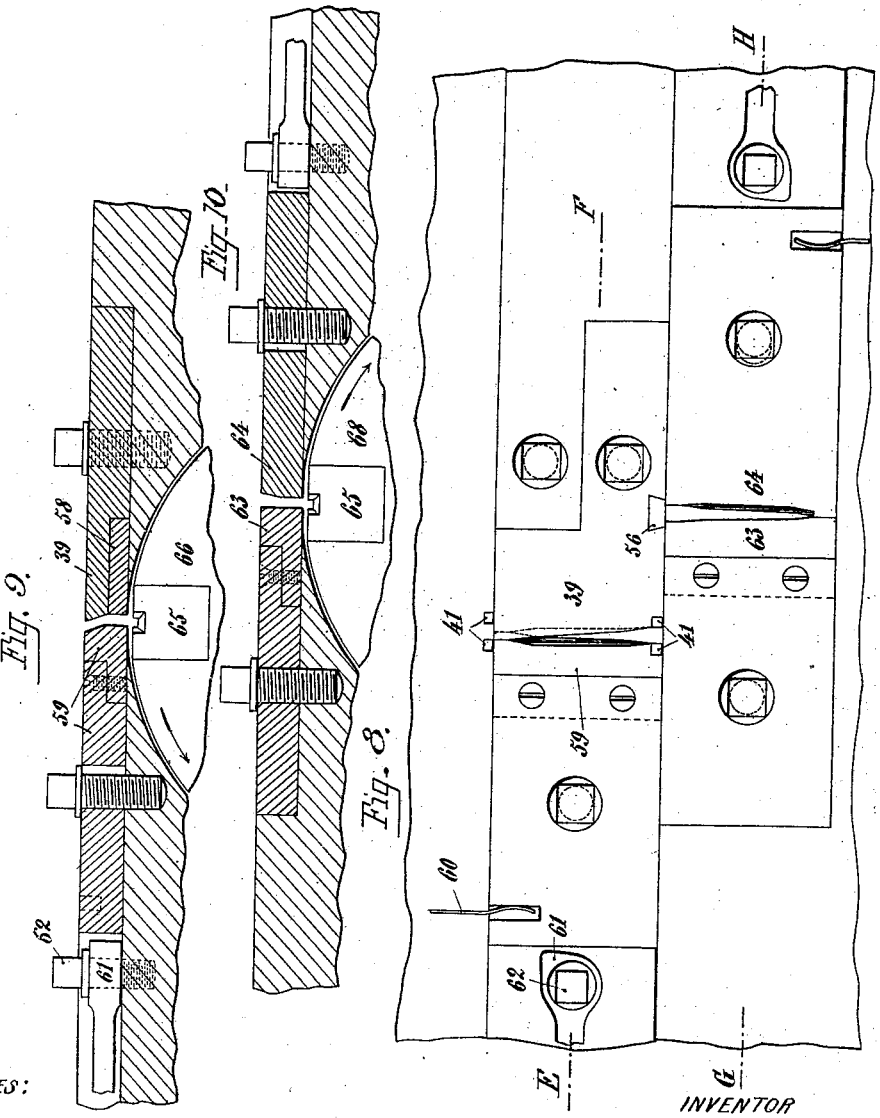

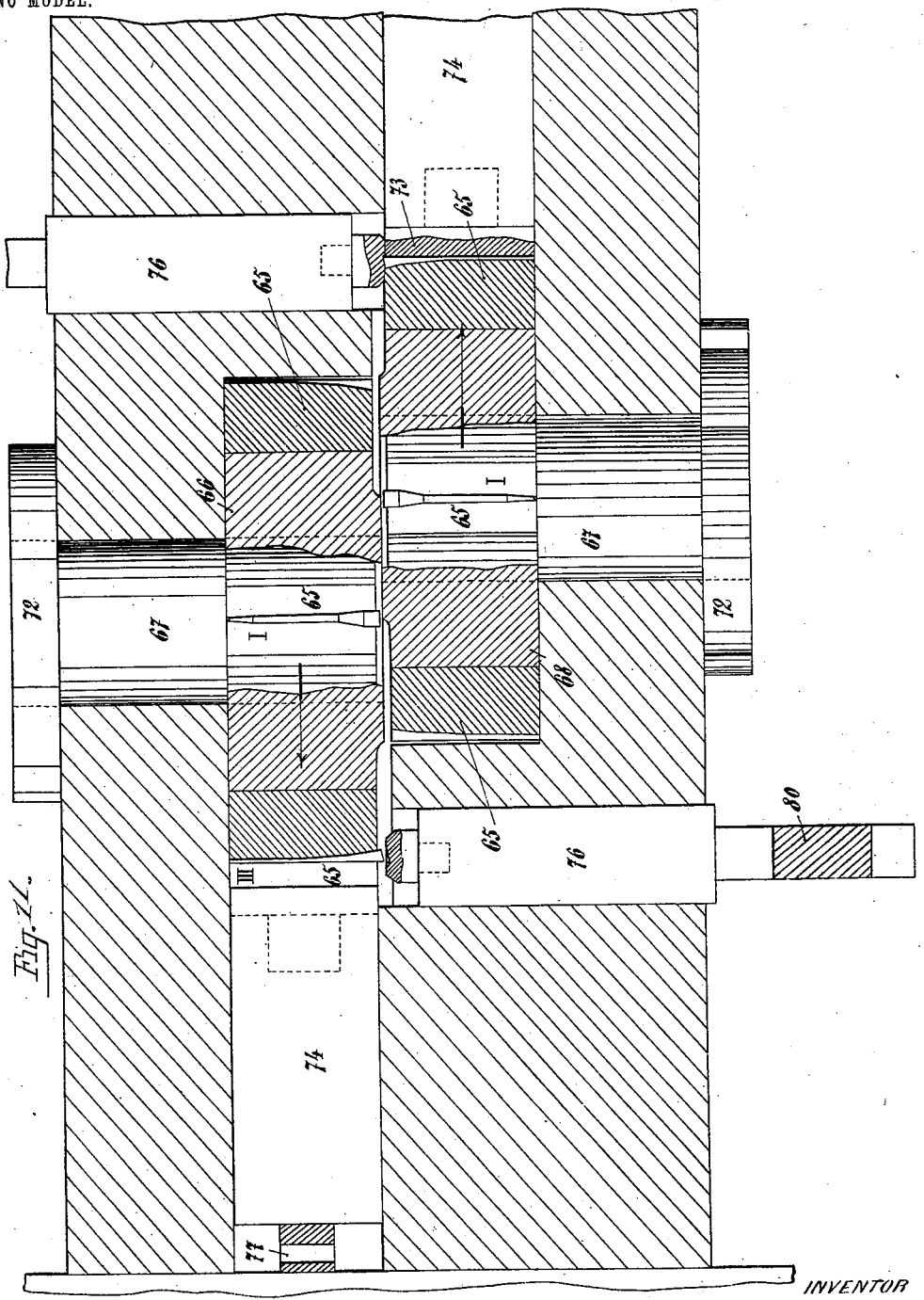

No. 749,135. PATENTED JAN. 5, 1904.
J. M. LAUGHLIN.
MACHINERY FOR THE MANUFACTURE OF HORSESHOE NAILS.
APPLICATION FILED NOV. 21, 1901.
NO MODEL. 14 SHEETS—SHEET 10.
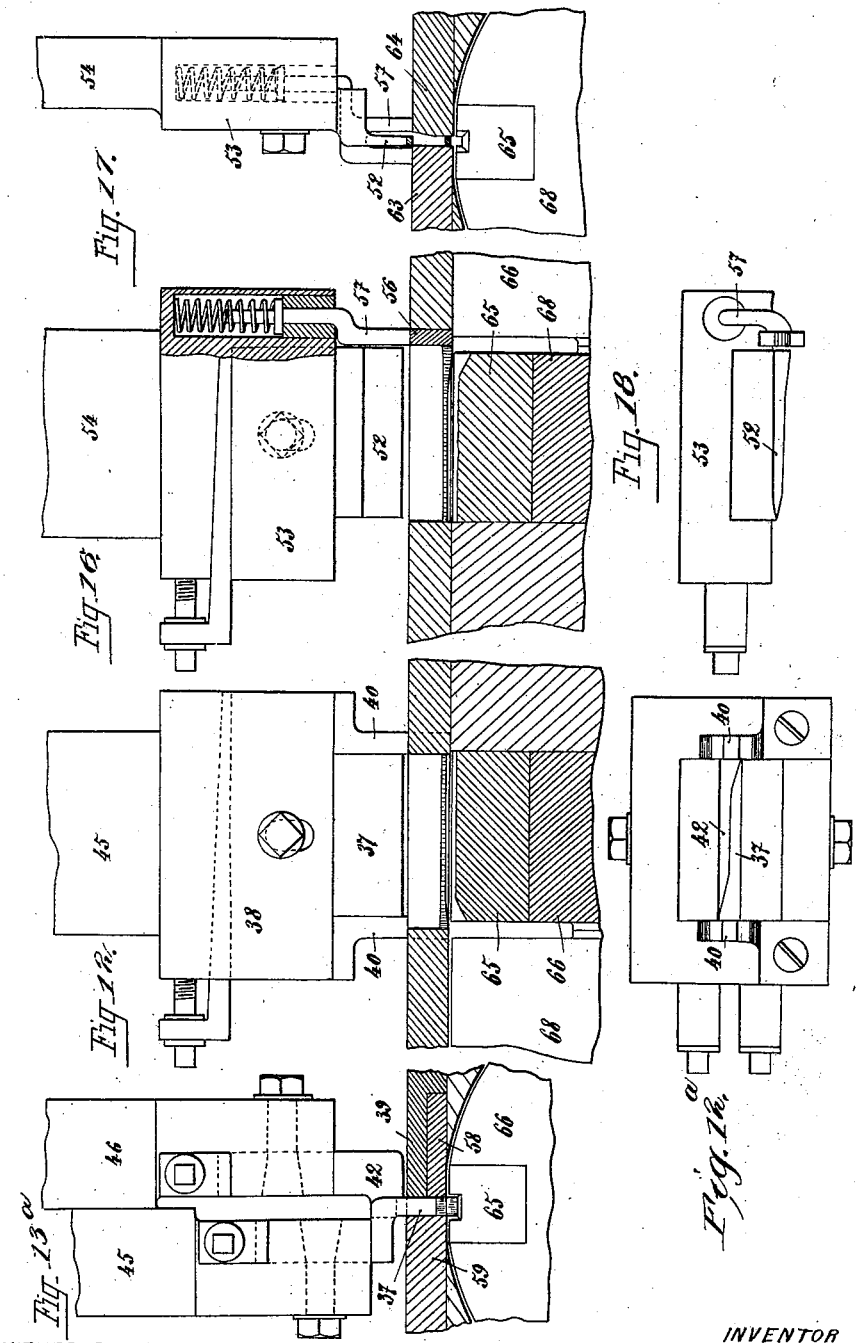
INVENTOR
Joseph Michael Laughlin
BY
ATTORNEYS No. 749,135. PATENTED JAN. 5, 1904.
J. M. LAUGHLIN.
MACHINERY FOR THE MANUFACTURE OF HORSESHOE NAILS.
APPLICATION FILED NOV. 21, 1901.
NO MODEL. 14 SHEETS—SHEET 11.
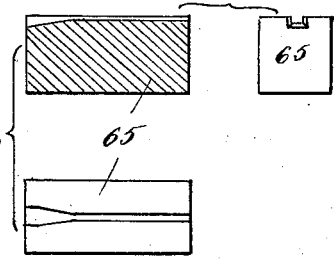
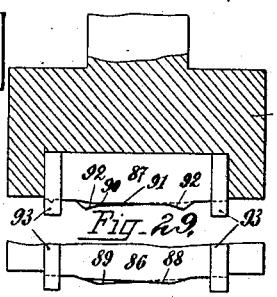
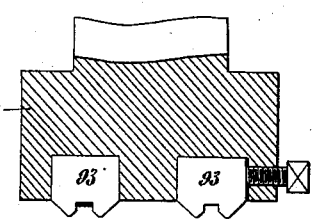
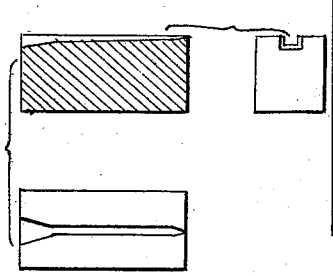
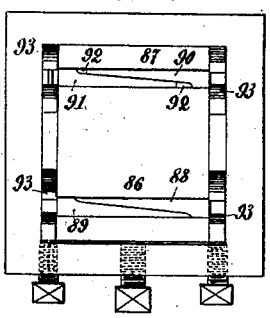
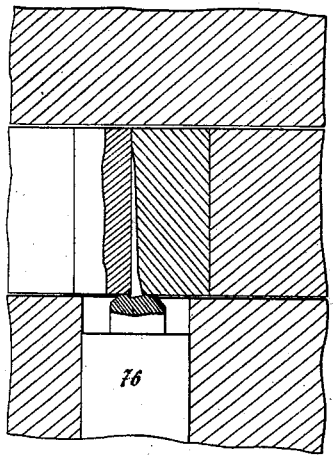
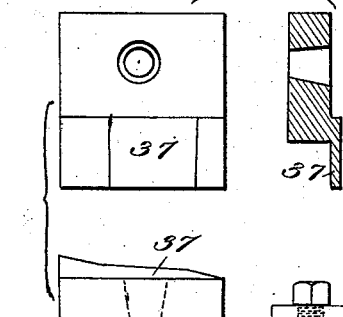
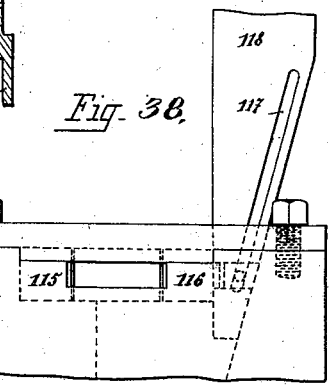
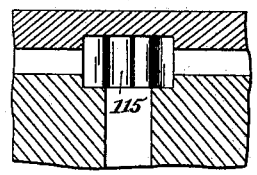
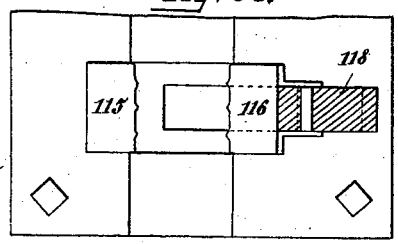
WITNESSES:
P. D. Rollhaus
J. P. Davis
INVENTOR
Joseph Michael Laughlin
BY
ATTORNEYS
THE NORRIS PETERS CO., PHOTO-LITHO., WASHINGTON, D. C.

No. 749,135. PATENTED JAN. 5, 1904.
J. M. LAUGHLIN.
MACHINERY FOR THE MANUFACTURE OF HORSESHOE NAILS.
APPLICATION FILED NOV. 21, 1901.
NO MODEL. 14 SHEETS—SHEET 12.

WITNESSES:
INVENTOR
Joseph Michael Laughlin
BY
ATTORNEYS

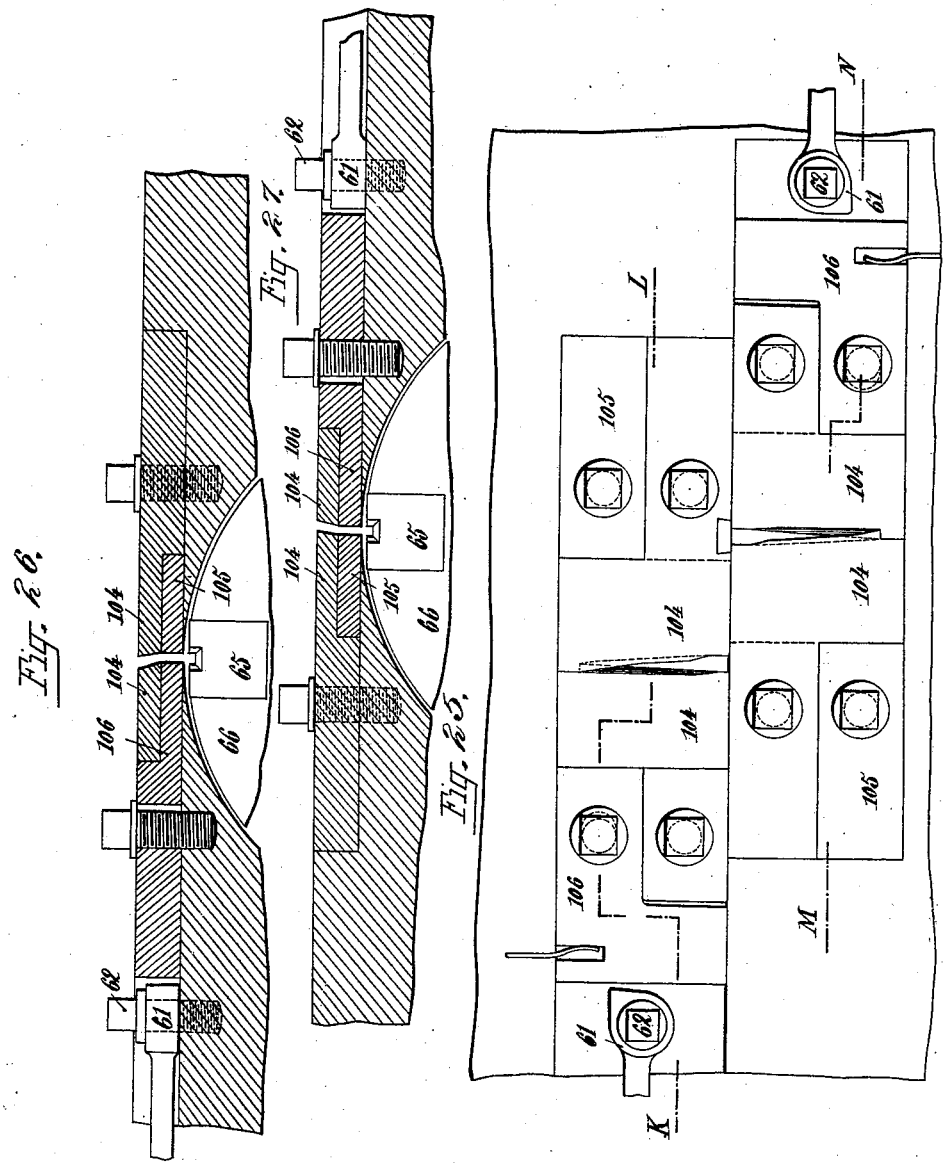

No. 749,135. PATENTED JAN. 5, 1904.
J. M. LAUGHLIN.
MACHINERY FOR THE MANUFACTURE OF HORSESHOE NAILS.
APPLICATION FILED NOV. 21, 1901.
NO MODEL. 14 SHEETS—SHEET 14.
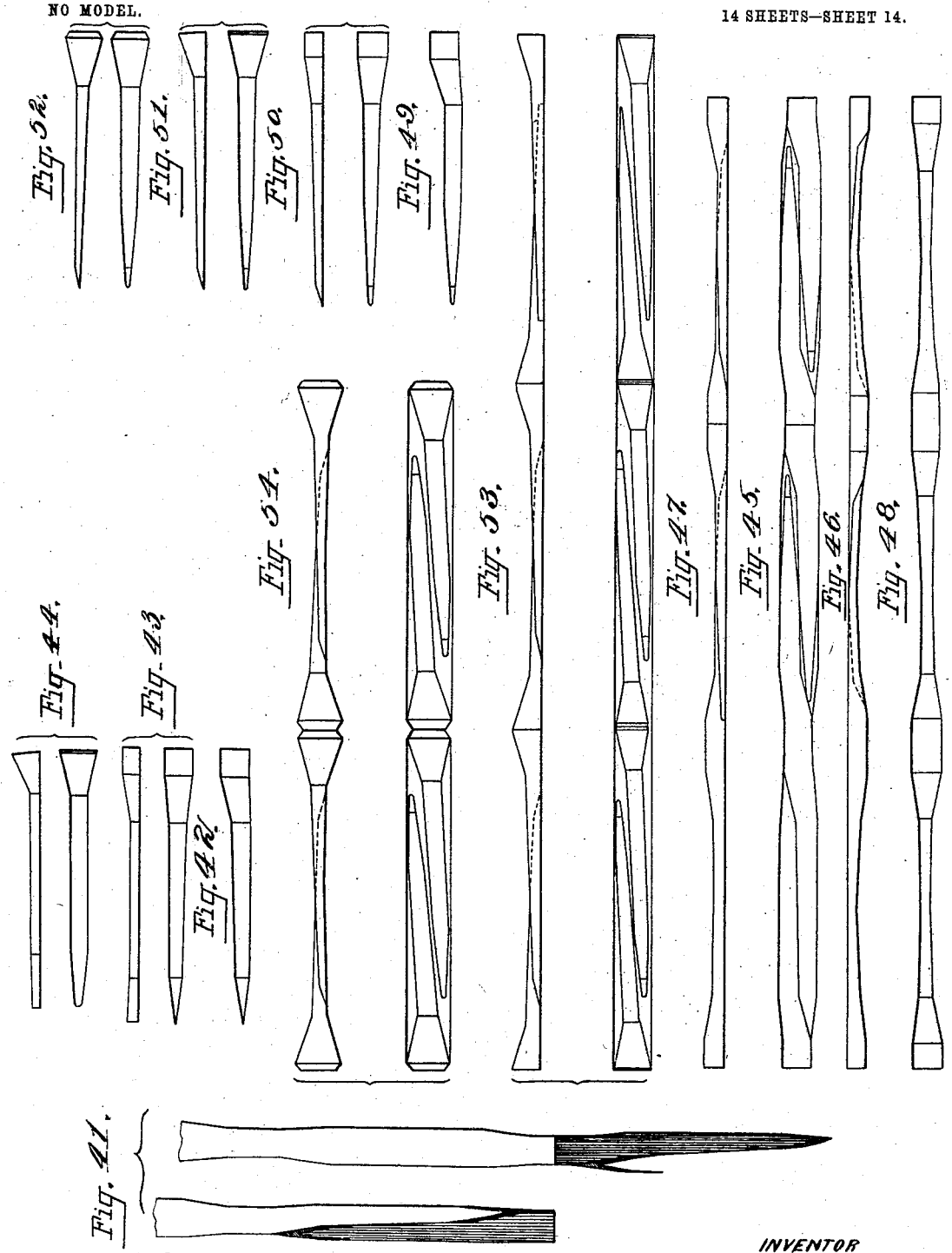
WITNESSES
INVENTOR
Joseph Michael Laughlin
BY
ATTORNEYS No. 749,135. Patented January 5, 1904.

UNITED STATES PATENT OFFICE.

JOSEPH MICHAEL LAUGHLIN, OF FOURCHAMBAULT, FRANCE.

MACHINERY FOR THE MANUFACTURE OF HORSESHOE-NAILS.

SPECIFICATION forming part of Letters Patent No. 749,135, dated January 5, 1904.

Application filed November 21, 1901. Serial No. 83,143. (No model.)

*To all whom it may concern:*

Be it known that I, JOSEPH MICHAEL LAUGHLIN, mechanical engineer, of Fourchambault, Nièvre, Republic of France, have invented Improved Machinery for the Manufacture of Horseshoe or other Nails, of which the following is a full, clear, and exact description.

The invention relates to machinery for the manufacture of horseshoe and other nails (whether in the form of blanks or in a finished condition) from a wire or rod of wrought-iron or mild steel rolled either hot or cold.

The invention consists of novel features and parts and combinations of the same, as will be fully described hereinafter and then pointed out in the claims.

The wire or rod from which the parts are to be made is previously converted by any suitable means into the desired shape, presenting on one or both faces the bosses required to form the nail-head, the shape of the rod employed depending on the kind of nail to be made. The shaped rod presents flat portions alternated with bosses, so as to permit of obtaining between the transverse axes of two consecutive bosses two blanks or nails whose shanks are adjacent and whose heads are opposed, the width of the flat portion being thus determined by the width of two adjoining blanks or nails and the length of the bosses corresponding to two heads placed end to end. The blanks or nails are cut from the rod by two series of operations—*i. e.*, diagonal cuts between the bosses and cross-cuts at the middle of each boss—and the heads of the blanks or nails are completed by upsetting. Two sets of cutting-tools are employed, which successively and respectively effect the two cuts before mentioned—viz., the diagonal and the cross cuts. The first tool cuts the rod diagonally between the first two bosses on such a line that two blanks will be cut without any waste, and at same time there will be formed the point at one side of the one blank and a shoulder on the adjacent side of the other blank, leaving the latter of larger section at its upper part, so that the blank may be rigidly supported when the head is upset. The blanks thus present one face shaped by rolling and one side shaped by this first cutting operation or partly by the swaging-tools, as will be explained hereinafter. The first tool thus cuts off a first blank, while the second blank is cut off by a second tool, which makes a cross-cut at the middle of the corresponding boss of the rod. The blanks thus cut are next engaged between two rectifying or straightening dies, of which the one is fixed and the other movable, disposed below each of the cutting-tools, the faces of said dies being shaped to correspond to the form to be given to the two sides of the blanks. By causing the movable die to close toward the fixed one a powerful pressure is applied, and the blank becomes rectified or straightened. The blank after having been thus cut and straightened is then engaged in one of the matrices or holders around the periphery of a carrier-disk which brings the blank opposite to punches for holding the shank and upsetting the head, and, lastly, above a receptacle into which it falls, or it may be conducted to any suitable finishing machine or machines. A carrier-disk is provided for each cutting-tool, and the two carriers receive at each operation an angular movement in opposite directions in order to respectively present their matrices opposite to the punches corresponding to said carriers. To each carrier-disk corresponds a punch which rigidly holds the blank, while a second punch upsets the head.

For making nails with the shank and point completely formed and for completely-finished nails swages for forming the shank and shaping the point and bevel will be arranged in advance of the cutting-tools lengthwise to follow the direction of the rolling of the rod and grain of the metal. As in consequence of the sharpened form given to the point by the cutting, there will be a small waste, the bed-cutter or die of each cutting-tool should in this case correspond to the form of the finished nail, the straightening and finishing of the nails being effected in the same manner as before described.

The accompanying drawings illustrate my improved arrangement of machine for making horseshoe-nails.

Figure 1 shows in two views the different transformations of the wire employed. Fig. 2 is a front elevation, and Fig. 3 is a part sectional side elevation, of the cutting-machine. Fig. 4 is a horizontal section on line A B, Fig. 2.

Fig. 5 is an end elevation showing the device for feeding the shaped rod. Fig. 6 is a rear elevation of the feed device. Fig. 7 is a vertical section on line C D, Fig. 4, drawn to a larger scale. Fig. 8 is a part plan of the table of the machine. Figs. 9 and 10 are vertical sections taken, respectively, on lines E F G H, Fig. 8. Fig. 11 is a horizontal section on line I J, Fig. 8. Fig. 12 is a part sectional elevation, and Fig. 12ª an under side plan, of the first cutting-tool. Figs. 13 and 13ª are end elevations showing the cutting-tool in two different positions—viz., at the moment of cutting the rod and at the moment of engaging the severed blank between the straightening-dies and forcing out the previously-straightened blank. Fig. 14 shows a front view section and under side plan of the upper cutter of the first tool. Fig. 15 shows similar views of the clamping-foot. Figs. 16 and 17 show part sectional front and end elevations, and Fig. 18 an under side plan, of the second cutting-tool. Fig. 19 is a plan showing the method of cutting the blanks. Fig. 20 shows in elevation and plan the devices for straightening the blank or nail. Figs. 21 and 22 represent a vertical section, end elevation, and plan of a die for a nail-blank and of a die for a finished nail, respectively. Fig. 23 shows an elevation of a modified form of the machine for making blanks or nails with finished shanks. Fig. 24 is a plan view of the bed of the same, the position of the swaging-dies and cutting-tools being indicated in dotted lines. Fig. 25 shows, on a larger scale, a part plan of the table of this machine. Figs. 26 and 27 are vertical sections of said table, taken, respectively, on lines K L M N, Fig. 25. Fig. 28 is a horizontal section showing the finishing of the shanks and the upsetting of the heads. Figs. 29 to 32 are detail views of the tools for swaging the shanks before cutting, Figs. 29 and 30 showing elevations of the two swages, Fig. 31 an under side plan, and Fig. 32 an end view of the same. Figs. 33 to 37 represent a modification of the finishing-tools, Figs. 33, 34, and 35 showing vertical and horizontal sections and end view of the finishing-tools when out of action, while Figs. 36 and 37 show vertical and horizontal sections of the same in work. Figs. 38 to 40 show a device which may be applied to the machine for compressing the shank on its two sides to give the shoulders the desired shape, Fig. 38 being a face view, Fig. 39 a plan, and Fig. 40 a vertical section, of the device. Fig. 41 shows the mode of cutting nail-blanks or nails with finished shanks. Fig. 42 shows a blank as cut and before being rectified. Fig. 43 shows two views of the same nail-blank when rectified. Fig. 44 shows similar views of the finished blank. Figs. 45, 46, and 47 show a plan and profile views of a rod for making American nails, Fig. 46 showing the case in which the bevel of the point is formed toward the flat face of the rod, while Fig. 47 shows it formed toward the bossed face. Fig. 48 shows a rod from which to make French nails. Fig. 49 shows a nail with a finished shank as cut before being rectified. Fig. 50 shows two views of the rectified nail. Figs. 51 and 52 each show two views of finished American and French nails, respectively. Fig. 53 shows face and edge views of a rod from which finished American nails may be cut. Fig. 54 shows face and edge views of a shaped rod from which finished French nails may be cut.

The same characters of reference indicate the same parts in all the figures.

Referring to Fig. 1, $a$ represents the wire or rod from which the nails or blanks are to be formed. In shaping the rod or wire $a$ it may be first straightened by any suitable mechanism and is then preferably subjected to the action of horizontal and vertical rolls, which flatten the wire or rod on its upper and lower faces $a'$ $a^2$ and also on the two sides $a^3$ $a^4$, so that the wire will be of uniform rectangular or other desired section. The rod is then subjected to the action of suitable mechanism to produce the bosses $b$ and the flat portion $c$ alternating with the bosses, the width of the flat portion being sufficient to form the shanks of two nail-blanks or nails.

The shaped rod is presented to the action of sets of cutting-tools by a feed device 16, Figs. 2 to 6, movable at the back of the machine to present the shaped rod to the action of the different sets of tools. This device comprises a frame carrying a pair of feed-rollers 17 18, respectively, in one with gear-wheels 19 20, by which the shaped rod is fed forward at the proper moments. The feed-rollers 17 18 are driven by a ratchet-wheel 21 on a hub 22, capable of turning freely in a bearing 23, but incapable of sliding movement. The spindle 24 of the roller 18 and toothed wheel 20 passes through the ratchet-wheel 21 and its hub 22 and is so connected therewith as to partake in the rotation of the ratchet-wheel 21 while capable, as hereinafter described, of sliding longitudinally therein. The ratchet-wheel 21 is operated by a pawl 25, which is brought down at each feed of the rod to an extent corresponding to the extent of feed desired, the pawl 25 being carried upon the end of a rod 26, which is jointed to a rock-lever 27, pivoted upon a cross-rod 28 and operated by a cam 29, keyed upon the main shaft 30.

The ratchet-wheel 21 might be keyed upon the shaft 24 and so partake in the sliding movement of the latter, in which case the pawl 25 would be sufficiently broad to always remain in engagement with the ratchet-wheel.

The feed-roller carriage 16 is caused to slide in a guideway 31 in the bed of the machine by a rock-lever 32 or its equivalent, pivoted at 33 and operated by an inclined cam-slot 34 at the end of a rod 35, actuated by a cam 36, fast on the main shaft 30, the vertical movement thus imparted to the cam-slot 34 moving the carriage 16 horizontally at back of machine in order that the shaped rod shall be presented successively to the first cutting-tool for making the diagonal cut by which the first nail-blank or nail is cut off and then to the second cutting-tool, which makes the transverse cut at the middle of the succeeding boss, so as to cut off the nail-blank or nail next to that which was severed by the first tool. These two cutting-tools perform different functions and are specially constructed. The first cutting-tool acts in the manner of shears to cut the shaped rod on a line corresponding exactly to the intended profile of the one side of each of the two contiguous blanks, this line of cut comprising, as shown in Fig. 19, a diagonal cut $d$ and two symmetrically-inclined cuts $d'\ d^2$, such that the two blanks are cut without any waste and at same time the point is formed upon the one side of the one and a shoulder upon the adjacent side of the other, as above stated. The shoulder portion being of larger section at its upper part enables the blank to be firmly supported in its holder or matrix during the upsetting of the head without liability of slipping.

The upper cutter 37, Fig. 14, of the first cutting-tool, which therefore has on the one face a profile corresponding to the line of cut $d'\ d\ d^2$, is mounted in a holder 38, Figs. 7, 12, and 13, and it cuts the shaped rod in the manner of a shears in conjunction with a bed-cutter 39, against which it slides in its descent, the latter being fixed on the table of the machine and the shaped rod resting on it, the upper edge of the bed-cutter 39 having therefore a profile corresponding in form to the line of cut $d\ d'\ d^2$, Figs. 7, 8, 9, and 20. In order to insure that the cutter 37 shall always cut the shaped rod at the desired points, the cutter-holder 38 has guides 40, by which the position of the rod relatively to the cutter 37 is insured, these guides 40 entering openings 41 in the table.

The shaped rod is firmly held during the action of cutter 37 by a clamping-foot 42, Fig. 15, carried by a holder 43 and having on one face exactly the same profile as the cutter 37, so that the two parts 37 and 42 may fit closely upon and slide the one against the other, Figs. 7, 12ª, and 13. The clamp 42 bears on the part of the shaped rod adjacent to the blank or nail to be cut off, and it has a slight longitudinal shoulder 44 to engage against the rear side of the shaped rod.

The two tool-carriers 38 and 43 are carried on the ends of plunger-rods 45 46, which receive vertical movement from two cams 47 48, formed on opposite faces of the cam-disk 49, Figs. 2 and 3.

In order to compensate for any irregularity in the thickness of the shaped rod and to insure its absolute immovability necessary to proper working, the rod 46, which carries the clamp 42, is made in two parts coupled by slotted plates 50 and having a strong spring 51 interposed between its members. When the feed device 16 first presents the shaped rod to the first cutting-tool, the tool-holder 38, Fig. 13, begins to descend, the guides 40 enter their holes 41 and insure the accuracy of position of the shaped rod relatively to the cutter 37, after which the clamp 42 comes down on the shaped rod, so as to firmly hold it while the cutter 37 completes its stroke, Fig. 13ª, and shears the shaped rod on the line of cut $d'\ d\ d^2$. The cutter 37 after having sheared off the first blank or nail continues its descent, so as to force the blank or nail between the straightening-dies, as hereinafter described.

After the first blank or nail has been cut off the feed-carriage 16 is moved laterally and the feed-rollers 17 18 are rotated to feed forward the shaped rod, so as to bring the portion thereof corresponding to the second blank or nail under the second cutting-tool. The latter is placed at one side of and in front of the first cutting-tool in order to enable the arrangement beneath these two cutting-tools of two carrier-disks, as hereinafter described.

The second cutting-tool shears the shaped rod transversely through the middle of a boss, so as to cut off the second blank or nail. The upper cutter 52 of this tool is carried by a holder 53, attached to a plunger 54, actuated by a cam 55, fast on the main shaft 30. (See Figs. 2, 3, 16, 17, and 18.) The cutter 52 in its downward movement acts in conjunction with a bed-cutter 56, let into the machine-table and on which the shaped rod rests during the cutting, the said rod or bar being held immovable while being cut by means of a spring-pressed guide 57, mounted in the holder 53.

When the shaped rod is brought beneath the cutter 52, the holder 53 comes down, the guide 57 insures the proper position of the rod beneath the cutter 52, and when the guide abuts against the table its spring is compressed, while cutter 52 continues its descent and makes its cross-cut. The cutter 52, like the cutter 37 of the first tool, descends sufficiently to cause the second blank or nail to enter between the straightening-dies hereinafter described. The nails or blanks cut by the first or diagonal set of cutters may be called the "series of nails No. 1," and the nails or blanks cut by the second or transverse cutter may be called the "series of nails No. 2."

The straightening-dies appertaining to the first cutting-tool are constructed as shown in Figs. 7, 8, 9, 10, and 20. Beneath the bed-cutter 39 is fitted in the machine-frame a fixed die 58, shaped to correspond to one side of the rectified blank or nail shown in Fig. 43. Facing this fixed die 58 is mounted a sliding die 59, shaped to correspond to the opposite side of the rectified blank or nail. The upper edge of this die, whose upper face is flush with the table, is beveled, so as to facilitate the entry of the blank or nail. This movable die 59 is carried by a holder fitted to slide in the frame and acted on by a spring 60, tending to press the die 59 up to its work, so that a blank or nail forced by the cutter 37 between the dies 58 and 59 will be held by the pressure of the spring. The die 59 is positively actuated to rectify the blank or nail by a cam or its equivalent 61, pivoted at 62 and operated in the manner hereinafter described. During this rectifying operation the head and body of the blank or nail is firmly gripped, rectified, and straightened, as shown in Figs. 8 and 43.

The rectifying-dies corresponding to the second cutting-tool and represented in Figs. 8, 10, 16, and 17 are similar except that as in this case the blank or nail is merely sheared off by a transverse cut the fixed die 63 may be flush with the surface of the machine-table, while the movable die 64 is arranged and operated as hereinbefore described. After the rectification of the first blank or nail the latter is forced down by the blank or nail next cut by the same tool (see Fig. 7) and is caused to enter one of the matrices or holders 65, Fig. 21, carried in the periphery of a disk 66, mounted upon a horizontal shaft 67, (see Figs. 2, 7, and 11,) by which the blank or nail is presented to the action of a shank-holder and head-upsetting punches and finally discharged. A similar matrix or holder disk 68 is arranged beneath the second set of rectifying-dies. The disk 66 revolves to the left and the disk 68 to the right, and each time that a blank or nail enters one of the matrices or holders 65 the disk is revolved so as to bring a vacant matrix opposite the rectifying-dies and advance the whole of the other dies one step, the exact position of the disk after each movement being insured by any suitable device. The two carrier-disks are arranged side by side, the axes of the disks being out of alinement with each other and the peripheral edges of the disks at opposite points projecting beyond or overlapping each other, so as to permit of the action of the nail-head-upsetting devices.

The angular movement is imparted at the proper moments to each of the matrix-carrier disks by a cam 69, Fig. 2, fast on main shaft 30, and which actuates, through a rod 70 and pawl 71, a ratchet-wheel 72, keyed fast on the disk-spindle.

When a blank or nail is received in the matrix or holder occupying the position I, (see Fig. 7,) the disk 66 receives an angular movement to the left, and the blank or nail is brought to the position II and at the next succeeding cut to the position III, where it is presented to the action of a punch 73, mounted in a plunger 74, sliding in a guide in the frame of the machine and which on its forward stroke exerts a powerful pressure upon the free side of the blank or nail for the purpose of holding said blank or nail firmly while its head is being upset by a heading-punch 75, carried by a plunger 76, fitted to slide in a guide in the frame. (See Figs. 7 and 11.)

The plunger 74 is operated by an inclined cam-slot 77, carried by a rod 78, operated by a cam 79, fast on the main shaft 30, (see Figs. 2, 4, and 7,) said rod 78 also serving to impart angular movement to the cam 61 at the moment the rectifying-punch 59 is to come into action. (See Figs. 4 and 7.) The plunger 76 is actuated by a lever 80, pivoted at 81, Fig. 3, and operated by a cam 82, fast on shaft 30, said lever 80 acting on plunger 76 through the aid of rollers 83 acting upon the opposite faces of an inclined rib 84, of steel, fixed on said plunger.

When a blank or nail reaches position III, the die 73 first advances and causes guide-pins 85, Fig. 7, to enter corresponding holes in the disk to insure the proper position of the latter, and then the punch 73, completing its stroke, exerts a powerful pressure upon the exposed side of the shank of the blank or nail, and it is only after the blank or nail has been thus firmly clamped in its matrix that the heading-punch 75 comes forward and upsets the head of the blank or nail. (See Fig. 11.) After this latter operation has been performed the blank or nail is brought first to position IV and then to position V, at which it is discharged into a receptacle or delivered to a finishing machine or machines, if in the blank form. To facilitate the discharge, any suitable arrangement of extractor may be employed. The vacant matrix or holder finally returns to its initial position I after successively occupying the positions VI VII VIII.

The disk 68 receives after each blank or nail of the second series has been cut an angular movement (in the reverse direction to the first disk) whereby the blank or nail is caused to successively occupy the positions I II III, Fig. 2. In the position III the blank or nail is acted on by the punches 73 75 for completing the formation of the shank, if necessary, and that of the head by compression, the action of these dies and their operative mechanisms being precisely similar to those above described, and the blank or nail after successively occupying the positions IV V is discharged into a receptacle by means of an extractor, if necessary, the vacant matrix finally returning through the positions VI VII VIII to the initial position I. This mode of manufacture also enables nails with completely-finished shanks and points to be directly produced, the machine in this case being provided with swaging-dies arranged lengthwise or on line with the nail-rod and in advance of the cutting-tools, as shown in Figs. 23, 24, and 29 to 32. These swaging-dies produce either upon the flat side, as in Fig. 46, or upon the opposite side, as in Fig. 47, of the shaped rod impressions corresponding to the intended form of the two nail-shanks by dressing the metal progressively from the head toward the point and to form the bevel of the point. Two such swaging-dies would be provided, the one, 86, to rough out the impressions and the other, 87, to complete them and to form the bevels of the points, the swaging-dies acting on the shaped rod in the direction of the grain of the metal as rolled.

The die 86 has two swages 88 89, corresponding to the two juxtaposed nails cut out at each operation and whose acting portions are of gradually-increasing depth toward the points of the nails. The die 87 also has two swages 90 91, similar to the preceding, but adapted to produce deeper impressions and terminated each by a projecting part 92, adapted to form the bevel of the point. The shaped nail-rod is presented successively by any suitable means to the action of the two swaging-dies 86 87 and is rigidly held in position beneath the same by means of forked guides 93, straddling the rod at both ends of the dies.

The two swaging-dies 86 87 are mounted in the same holder 94, fixed to a plunger 95, which receives vertical movement through a lever 96, Fig. 23, pivoted at 97 and operated by a cam fast on the main shaft 30, said plunger 95 being for this purpose provided at its upper part with an inclined rib 98, of steel, upon the opposite sides of which act a pair of friction-rollers 99 100, mounted on lever 96, so that when the lever is moved in the direction of the arrow the roller 100, which acts upon the upper surface of the rib 98, will force the plunger 95 down, while by the opposite movement of the lever 96 the roller 99 will act on the under face of the rib 98 and raise the plunger 95.

The nail-rod is supported during the swaging operations upon an anvil 101, Fig. 24, which is keyed in a frame 102, carried by the table of the machine, and has grooves 103 for the passage of the forked guides 93. The swaging may be done in the flat face of the shaped rod, as shown in Fig. 46, in which case the bevel for the point would first be formed upon the opposite face and be rectified, if need be, by the holding or fastening punches or dies, or the point-bevel may be formed upon the same face as the bosses, as shown in Fig. 47. The swages might be formed upon the anvil 101, which would in this case constitute a bottom swage. The roughing-out swage 86 would be alined with the cutting-tool making the transverse cut for cutting the series of nails No. 2 and the finishing-swage with the tool making the diagonal cut for cutting series of nails No. 1. (See Fig. 24ª.)

When the shaped rod is presented by the feed-rollers 17 18 or their equivalent to the first cutting-tool, the nail No. 1 is thereby cut in accordance with the finished impressions previously made by the roughing-out and finishing swages at same time that the swage 87 finishes the impression previously roughed out by the swage 86 and forms the bevel of the point.

When the two swages have done their work, the carriage 16 is moved laterally and the feed-rollers 17 18 are rotated to feed to the second cutting-tool the portion of the rod swaged to the form of nail No. 2 at same time that the swage 86 makes the rough impression on the part of the rod from which the two next nails are to be cut. After the second nail has been cut off the carriage 16 is returned and presents the nail-rod to the first cutting-tool.

When the points of the blanks or nails are cut out of finished form, there is a little waste, and therefore the blanks or nails should be cut out by tools corresponding exactly to the intended form of the blank or nail. (See Figs. 25 to 27.) Each of the bed-cutters corresponding, respectively, with the two upper cutters comprises two fixed plates 104, bolted to the table of the machine, and beneath these plates are fitted the stationary and the movable rectifying-dies 105 and 106, which are similar to 39 and 58, before described with reference to Fig. 20.

When the first blank or nail is cut, the waste remains upon the rod, as shown in Fig. 41, and on the second blank or nail being cut the waste remains upon the table. The operations of rectifying or straightening and compressing the shank and of heading are effected in the manner hereinbefore described, the form of the matrix and punches only being varied to correspond to the shape of the nail.

The matrices or holders 65, carried by the disks 66 68, may consist, as shown in Figs. 22 and 28, of a block having in its outer face a cavity corresponding in form to the nail, or they may be formed as represented in Figs. 33 to 37. In this case each comprises a fixed jaw 107 and a movable jaw 108, pressed apart by a spring 109. The jaw 107 has a cavity 110, which corresponds in form to one face and one side of the nail, while jaw 108 has a cavity 111, corresponding in form to the opposite side of the nail. The nail when placed in the matrix enters the cavity 110 of the jaw 107, and, if necessary, its position therein may be insured by a suitable pusher.

In order to complete the fashioning of the shank of the blank or nail and the upsetting of the head, the matrix is brought opposite to a matrix-closing block 112, having a cavity with an inclined face 113, adapted when the block 112 is advanced to act on the movable jaw 108 and close it against the fixed jaw of the matrix or holder. The block 112 carries a die 114, which bears against the exposed face of the shank, as shown in Figs. 41 and 42, and exerts a powerful pressure over the whole surface of the blank while the head is being formed by means of die 75. This done, the block 112 is retracted, the movable jaw 108 is moved by its spring 109 away from the fixed jaw 107, and the finished nail can then drop out on the matrix or holder arriving over the discharge-aperture. The machine may also be provided with a device (shown in Figs. 38 to 40) either for compressing the shank sidewise for the purpose of imparting the desired form to the shoulder or for cross-notching the bosses of the nail-rod. This device, which would be mounted in advance of the swaging-dies, comprises a fixed die 115 and a die 116, moving in a guide, the dies 115 and 116 having ribs of a form suited to the different types of nails. The movable die 116, which always partakes in the lateral movement of the nail-rod, is operated by means of an inclined slot 117 at the lower end of a rod 118, which receives vertical movement from the main driving-shaft.

By my machine all kinds of nails or nail-blanks or finished nails of the French, American, and other types may be made, and it will be understood that the rods from which the blanks or nails are to be cut may be rolled of any form to suit the type of nail-blanks or nails to be made. For instance, the rod intended more particularly for making French nails may be rolled so as to present the same profile on both faces, as shown in Fig. 48.

The machine is also adapted for directly cutting out completely-finished nails. Fig. 53 shows a form of rod suitable for making American nails, and Fig. 54 shows a form of rod for cutting out completely-finished nails.

It is to be understood that the machine may be varied in form and dimensions and that the several mechanisms and accessory arrangements may be modified to suit the nature of particular requirements.

Having thus described my invention, I claim as new and desire to secure by Letters Patent—.

1. In a machine for making horseshoe and other nails from a rolled-wire rod, the combination with a first cutting-tool for making the diagonal cut between the bosses to cut off the first blank or nail, the said tool comprising an upper cutter having its cutting face shaped according to the intended line of cut, a bed-cutter acting in conjunction with the upper cutter and fixed to the table of the machine, and a clamping-foot for maintaining the rod in position during the cutting, of a second cutter located at one side of the first cutter and in front of the same for making the transverse cut at the middle of the boss to cut off the second blank or nail, matrix-holder drums mounted to revolve below the cutting-tools the said drums being arranged side by side and mounted on separate horizontal axes, the drums overlapping each other, and a feed device for feeding the rod to the cutting-tools, the said feed device being mounted to slide laterally on the bed of the machine to present the rod successively to the said cutting-tools, as set forth.

2. In a machine for making horseshoe and other nails, a feed device for feeding the rolled rod, cutting-tools to which the rod is successively fed for making respectively the diagonal cut, and the transverse cut, one of the said cutting-tools being located at one side of and in advance of the other, rectifying devices disposed beneath each of the cutting-tools and comprising a fixed die and a sliding die shaped to correspond to the side form of a blank or nail after cutting or shearing, said blank or nail being inserted between the rectifying-dies by the cutting-tools, and matrix-holders mounted to revolve below the cutting and rectifying dies, as set forth.

3. In a machine for making horseshoe and other nails, a feeding device for the rod, cutting-tools for cutting the blanks or nails, one of said cutting-tools being arranged to make the diagonal cut between the bosses and the other to make the transverse cut at the middle of the boss, and one of said cutting-tools being located at one side of and in front of the other, rectifying-dies for straightening the blanks or nails, matrix-holder drums mounted to revolve below the cutting and rectifying dies so as to always present a vacant matrix for receiving a rectified blank or nail, means for imparting an angular movement to the said holder-drums after each cut is made, and punches for acting on the shank and head of said blanks or nails, as specified.

4. In a machine for making horseshoe and other nails, a feed-carriage for the rolled rod, cutting-tools to which the rod is successively fed for making respectively the diagonal cut and the transverse cut, one of said cutting-tools being located at one side of and in front of the other, rectifying devices arranged beneath the cutting-tools, matrix-holder drums mounted to revolve below the cutting and rectifying devices, and arranged to receive the rectified blanks or nails, means for moving said holder-drums, a punch adapted to exert pressure on the shank of each nail or blank and hold it firmly in position, and a second punch for upsetting the head of the blank or nail, as set forth.

5. In a machine of the character described, the combination with the tool for cutting out the blanks or nails, of the rectifying device comprising a bed-die and a sliding die shaped to correspond to the two sides of a perfect blank or nail, said dies being beveled to facilitate the entry of the blank or nail, a spring for pressing the movable die up to its work, the said blank or nail being forced by the cutting-out tool into position between the bed-die and movable die, and means for positively actuating the movable die to apply the necessary rectifying pressure to the nail or blank, as set forth.

6. In a machine of the character described for the manufacture of nails from a shaped rod having flat portions alternating with bosses, and in which the flat portions are of such dimensions as to comprise the juxtaposed shanks of two blanks or nails extending lengthwise of the rod, the combination with the swaging-dies arranged alongside each other one of said dies for roughing out impressions upon the shaped rod corresponding to the exact form of the shanks, the said die having two swages corresponding to the two juxtaposed nails to be cut out at each operation, and the other swaging-die also having two swages for finishing said impressions, the said swages each having a projecting part for forming the bevel of the point, and means for holding the shaped rod in position beneath the swaging-dies, of two sets of cutting devices one of said cutting devices being in alinement with the finishing swaging-die, and adapted to make the diagonal cut between the bosses on the line of the impressions made by the swaging-dies, to cut the first blank or nail, and the other cutting device being in alinement with the roughing swaging-die and adapted to make the transverse cut at the middle of the boss to cut off the second blank or nail at the time the roughing swaging-die is acting on the part of the rod from which the two next nails are to be cut, and means for feeding the rod to the swaging-dies and cutting devices, the feeding means having lateral movement whereby the rod can be presented successively to the respective swaging-dies and cutting devices, as set forth.

7. In a machine of the character described, the combination with a feed device for feeding the shaped rod, of a cutting-tool for making the diagonal cut, and comprising an upper cutter, a holder on which said cutter is mounted, and guides on the cutter-holder and entering openings in the table, the said guides serving to insure the position of the rod relatively to the cutter, a bed cutter or die fixed on the table of the machine, and a clamping-foot for maintaining the shaped rod in position during the cutting.

8. In a machine for making horseshoe and other nails from a shaped rod or wire, two sets of cutting devices to which the shaped rod is successively fed to cut the nails from the rod, one of said sets of cutting devices being arranged at one side of and in front of the other set, and a feeding device for the rod comprising a carriage and feed-rollers carried by said carriage for feeding the rod or wire forward, the said carriage being mounted to slide laterally in a guideway in the bed of the machine to present the wire or rod successively to the said sets of cutting devices, means for moving the carriage laterally, means for driving the feed-rollers to feed the rod or wire forward, and carrier-disks mounted to rotate beneath the cutters and arranged to receive the blanks or nails, the said disks being arranged side by side and the axes of said disks being out of alinement with each other, as specified.

9. In an apparatus for making horseshoe and other nails from a shaped rod having flat portions alternating with bosses, sets of swaging devices arranged alongside each other for respectively roughing out and finishing impressions upon the shaped rod corresponding to the form of the shanks of the nails to be cut, sets of cutting devices for cutting the nails from the rod, one of said sets of cutting devices being at one side of and in front of the other set, the said cutting devices being located in alinement with the respective swaging-dies, and one of the sets of cutting devices making the diagonal cut through the rod and the other making the transverse cut, a feeding device for feeding the rod successively to the sets of swaging devices and the sets of cutting devices, rectifying-dies beneath the sets of cutting devices for straightening the cut nails, and holders adapted to receive the nails from the rectifying devices.

10. In a machine of the character described, the combination with the two swaging-dies arranged alongside each other for swaging the shaped rod lengthwise of the same prior to the action of the cutting devices, one of said dies roughing out impressions upon the shaped rod corresponding to the form of the nail-shanks, and the other finishing said impressions, and the two sets of cutting devices, one of said sets of cutting devices being located in alinement with the finishing swaging-die and adapted to make the diagonal cut between the bosses to cut off the first nail or blank and the other being located in alinement with the roughing swaging-die and adapted to make the transverse cut at the middle of the bosses, to cut off the second nail or blank, of the feed device for feeding the shaped rod in direction of its length, the said feed device being mounted to slide laterally on the bed of the machine to present the rod successively to the respective swaging-dies and the sets of cutting devices, and the rectifying-dies disposed beneath the cutting devices for straightening the nails cut.

11. In a machine for making horseshoe and other nails from a rolled wire rod, the combination with the two sets of swaging-dies arranged alongside each other for swaging the shaped rod lengthwise of the same prior to the action of the cutting devices, and the two sets of cutting devices arranged in rear of and in alinement with the respective swaging-dies, the first cutting device being constructed to cut diagonally through the rod and the second to cut transversely through the same, of a feed device for feeding the rod in direction of its length to the said swaging-dies and cutting devices the said feed device having lateral movement on the bed of the machine whereby the rod can be presented successively to the sets of swaging-dies and sets of cutting devices, a rectifying device located beneath each set of cutting devices for straightening the cut nails or blanks, a holder mounted to revolve below each rectifying device and adapted to receive the nails or blanks therefrom, and means for clamping the nail or blank in position in the holder.

12. In a machine for making horseshoe and other nails from a rolled wire or rod, the combination with the two sets of swaging devices arranged alongside each other, and the two sets of cutting devices arranged in rear of the swaging devices, the first cutting device being constructed to cut diagonally through the rod and the second cutting device making the transverse cut, of the feed device for feeding the rod forward in direction of its length, the said feed device having lateral movement whereby the rod can be presented successively to the respective sets of swaging devices, and successively to the sets of cutting devices.

13. In a machine for making horseshoe and other nails from a rolled wire or rod having flat portions alternating with bosses and in which the flat portions are of such width as to comprise the shanks of two nails to be formed, the combination with the two sets of swaging devices arranged alongside each other, one of said sets being arranged for roughing out impressions upon the flat portion of the shaped rod corresponding to the intended form of the two nail-shanks, and the other for finishing said impressions, of the two sets of cutting devices located in rear of the swaging-dies, one of said sets of cutting devices making the diagonal cut between the bosses on the line of the impressions made by the swaging-dies and the other for making the transverse cut at the middle of each boss, of a feed-carriage provided with means for feeding the rod forward, the said carriage being mounted to slide laterally on the bed of the machine in advance of the swaging-dies for the purpose set forth.

14. In a machine for making horseshoe and other nails, a feed device for the rolled rod, cutting-tools to which the rod is fed for cutting the blanks or nails, one of said cutting-tools being arranged alongside of and in advance of the other the cutting-tools being constructed to make respectively the diagonal and transverse cuts through the rod, rectifying devices arranged beneath the cutting-tools, holders mounted to revolve below the cutting and rectifying devices and arranged to receive the rectified blanks or nails, the said disks being arranged side by side, and overlapping each other at opposite points and means for revolving said holders in opposite directions, as set forth.

15. In a machine for making horseshoe and other nails, the combination with a feed device for feeding the rolled rod, swaging devices and cutting-tools to which the rod is successively fed, the swaging devices being arranged alongside each other and the cutting-tools being arranged in alinement with the respective swaging devices, one in advance of the other, one of said cutting-tools being constructed to cut diagonally through the rod and the other to make the transverse cut, and rectifying devices arranged beneath each of the cutting-tools for straightening the blanks or nails, of disks mounted to revolve below the rectifying devices and each carrying holders in its periphery to receive the nails or blanks from the respective rectifying devices, the said disks being arranged side by side, and mounted on separate axes out of alinement with each other, whereby the peripheral edges of the disk overlap each other at opposite points, means for revolving the disks in opposite directions, and means for clamping the nails or blanks in position in the holders for the purpose set forth.

16. In a machine for making horseshoe and other nails from a rolled wire or rod having flat portions alternating with bosses and in which the flat portions are of such width as to comprise the shanks of two nails to be formed, the combination with the two cutting devices for making respectively the diagonal cut between the bosses and the transverse cut at the middle of each boss, one of said cutting devices being located at one side of and in advance of the other, and the feeding device for feeding the rod successively to the cutting devices, of the two carrier-disks provided in their peripheries with matrices or holders for receiving the cut nails or blanks, the said disks being arranged one in advance of the other mounted to revolve one below each of said cutting devices to always present a vacant matrix for receiving a blank or nail, as set forth.

17. In a machine for making horseshoe and other nails from a rolled wire or rod having flat portions alternating with bosses and in which the flat portions are of such width as to comprise the shanks of two nails to be formed, the combination with the cutting-tools for making respectively the diagonal cut between the bosses and the transverse cut through the middle of each boss, one of said cutting-tools being located at one side of and in front of the other, and the feeding device for feeding the rod successively to the cutting-tools, of the matrix-holder drums or disks located one in advance of the other and mounted to revolve below the respective cutting-tools, to always present a vacant matrix for receiving a blank or nail, the axes of the said drums or disks being out of alinement with each other, whereby the peripheral edge of one disk projects beyond that of the other, means for imparting movement to the said drums after each cut is made, means for exerting pressure on the shank of each blank or nail to hold it firmly in position in the matrix, and means for upsetting the head of the blank or nail, as set forth.

The foregoing specification of my improved method of and machinery for the manufacture of horseshoe and other nails signed by me this 4th day of November, 1901.

JOSEPH MICHAEL LAUGHLIN.

Witnesses:
EDWARD P. MACLEAN,
MAURICE H. PIGNET.